US009119074B2

(12) United States Patent
Tavildar et al.

(10) Patent No.: US 9,119,074 B2
(45) Date of Patent: Aug. 25, 2015

(54) UPLINK DOWNLINK RESOURCE PARTITIONS IN ACCESS POINT DESIGN

(75) Inventors: Saurabh Tavildar, Jersey City, NJ (US); Junyi Li, Chester, CA (US); Thomas J. Richardson, South Orange, NJ (US); Nilesh N. Khude, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 13/488,730

(22) Filed: Jun. 5, 2012

(65) Prior Publication Data
US 2013/0322351 A1    Dec. 5, 2013

(51) Int. Cl.
*H04W 4/00* (2009.01)
*H04W 16/10* (2009.01)
*H04W 72/08* (2009.01)
*H04W 72/04* (2009.01)

(52) U.S. Cl.
CPC ............ *H04W 16/10* (2013.01); *H04W 72/082* (2013.01); *H04W 72/0406* (2013.01)

(58) Field of Classification Search
CPC ...... H04W 72/04; H04W 28/00; H04W 88/08
USPC ......... 370/328–329, 330, 335–338, 340–345, 370/347, 436–437, 441–444, 458, 462, 465, 370/468, 479–480
See application file for complete search history.

(56) References Cited

U.S. PATENT DOCUMENTS

| 5,594,720 | A * | 1/1997 | Papadopoulos et al. ...... 370/330 |
| 5,719,859 | A * | 2/1998 | Kobayashi et al. ........... 370/347 |
| 6,747,963 | B1 * | 6/2004 | Park et al. ..................... 370/335 |
| 7,580,387 | B2 * | 8/2009 | Kayama et al. ............... 370/329 |
| 7,586,893 | B2 * | 9/2009 | Takano ......................... 370/348 |
| 7,587,212 | B2 * | 9/2009 | Kang et al. .................... 455/510 |
| 7,602,761 | B2 * | 10/2009 | Lin et al. ....................... 370/347 |
| 7,974,240 | B2 * | 7/2011 | Liu et al. ....................... 370/329 |
| 7,978,624 | B2 * | 7/2011 | Wang et al. ................... 370/252 |
| 8,014,366 | B2 | 9/2011 | Wax et al. |
| 8,116,780 | B2 * | 2/2012 | Lee et al. ................... 455/452.1 |
| 8,135,429 | B2 * | 3/2012 | Kuroda et al. ................ 455/522 |
| 8,363,606 | B2 * | 1/2013 | Montojo et al. .............. 370/329 |
| 8,477,830 | B2 * | 7/2013 | Myers et al. .................. 375/150 |

(Continued)

FOREIGN PATENT DOCUMENTS

| EP | 2166804 A1 | 3/2010 |
| WO | WO-2012000266 A1 | 1/2012 |

OTHER PUBLICATIONS

International Search Report and Written Opinion—PCT/US2013/044336—ISA/EPO—Nov. 14, 2013.

*Primary Examiner* — Kevin Mew
(74) *Attorney, Agent, or Firm* — James K. O'Hare

(57) ABSTRACT

A method, an apparatus, and a computer program product for wireless communication are provided in which information indicating a partitioning between uplink and downlink resources is received, and communication with an access point to determine at least one of whether a downlink resource will be used for uplink or whether an uplink resource will be used for downlink is performed. Accordingly, a synchronous network may be provided where partitioning of uplink-downlink resources may be dynamically selected, which is more efficient than a synchronous network where uplink-downlink resource partitioning is global and semi-static.

41 Claims, 14 Drawing Sheets

(56) References Cited

U.S. PATENT DOCUMENTS

| | | | |
|---|---|---|---|
| 8,559,381 B2* | 10/2013 | Ojala et al. | 370/329 |
| 8,694,013 B2* | 4/2014 | Mekhail et al. | 455/450 |
| 8,761,097 B2* | 6/2014 | Vajapeyam et al. | 370/329 |
| 8,774,101 B2* | 7/2014 | Lim et al. | 370/329 |
| 8,837,335 B2* | 9/2014 | Susitaival et al. | 370/294 |
| 2003/0236103 A1* | 12/2003 | Tamaki et al. | 455/552.1 |
| 2006/0215611 A1* | 9/2006 | Nakagawa et al. | 370/332 |
| 2007/0297363 A1* | 12/2007 | Jalil et al. | 370/330 |
| 2009/0010228 A1* | 1/2009 | Wang et al. | 370/335 |
| 2009/0046649 A1* | 2/2009 | Gao et al. | 370/329 |
| 2009/0168716 A1 | 7/2009 | Moon et al. | |
| 2009/0290550 A1 | 11/2009 | Bhattad et al. | |
| 2010/0029282 A1 | 2/2010 | Stamoulis et al. | |
| 2010/0238883 A1 | 9/2010 | Borran et al. | |
| 2010/0309876 A1 | 12/2010 | Khandekar et al. | |
| 2011/0274031 A1* | 11/2011 | Gaal et al. | 370/315 |
| 2011/0286407 A1* | 11/2011 | Vajapeyam et al. | 370/329 |
| 2012/0099453 A1* | 4/2012 | Sagfors et al. | 370/252 |

* cited by examiner

UPLINK DOWNLINK RESOURCE PARTITIONS IN ACCESS POINT DESIGN

BACKGROUND

1. Field

The present disclosure relates generally to communication systems, and more particularly, to partitioning between uplink and downlink resources used for communication.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In a synchronous time division duplex (TDD) access network, uplink (UL) and downlink (DL) resource partitioning is global and semi-static. That is, all access points (APs) of such a network are synchronous and adhere to a global UL-DL resource partitioning pattern. This may cause inefficient resource utilization. For example, a network may be partitioned to have a percentage of its total available resources dedicated for uplink transmissions. However, if there is no uplink traffic for some of the APs of the network, the partitioned uplink resources are wasted. Moreover, because of the semi-static resource partitioning, the uplink and downlink resources experience overload and/or under-utilization due to traffic patterns changing over time.

Accordingly, a synchronous network is provided where partitioning of uplink-downlink resources may be dynamically selected, which is more efficient than the synchronous network having the global and semi-static uplink-downlink resource partitioning. In an aspect of the disclosure, a method, an apparatus, and a computer program product for wireless communication are provided in which information indicating a tentative partitioning between uplink and downlink resources is received, and communication with an access point to determine at least one of whether a downlink resource will be locally used for uplink or whether an uplink resource will be locally used for downlink is performed before using each data resource.

DETAILED DESCRIPTION

Figure 1:
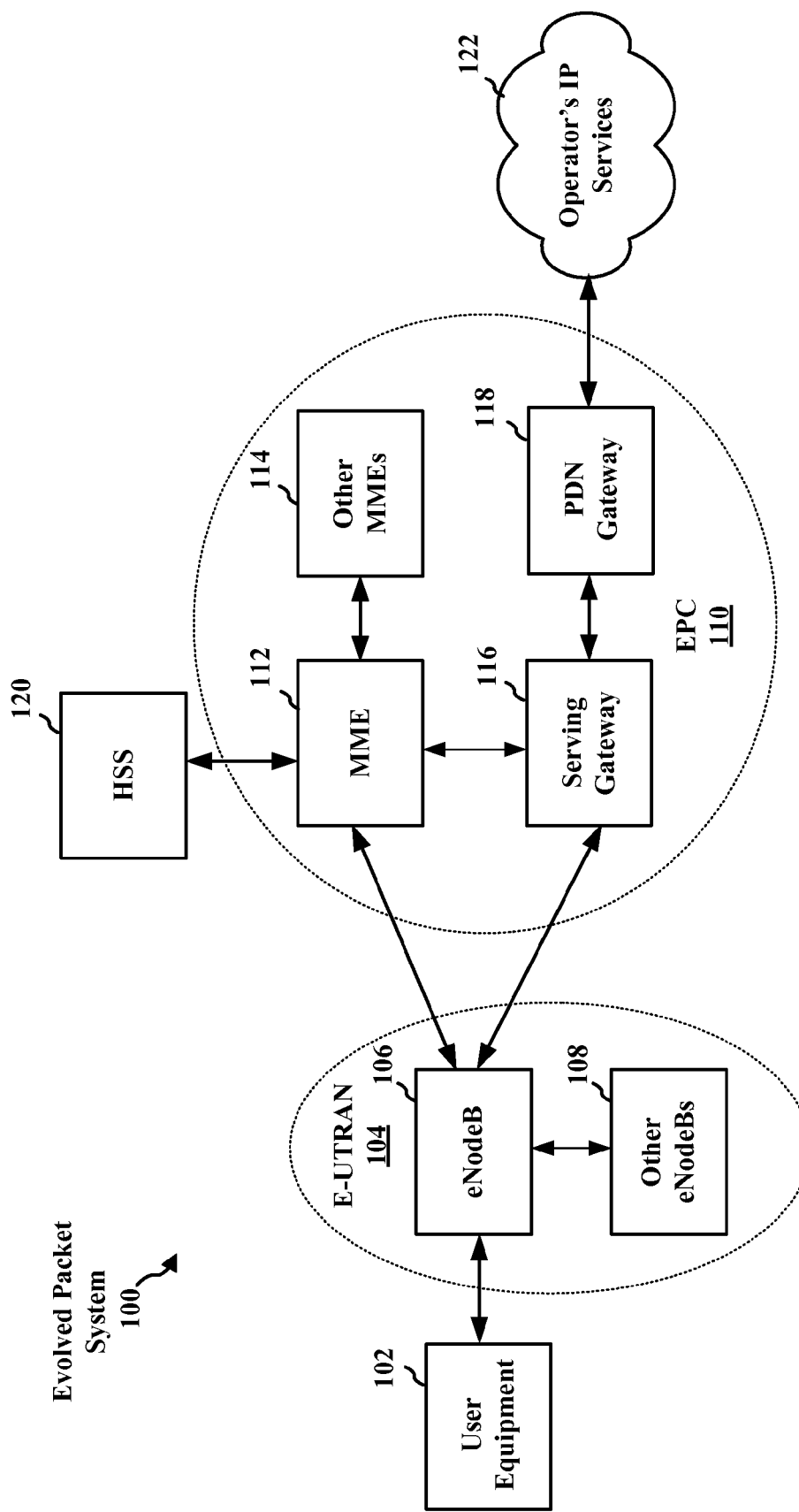
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
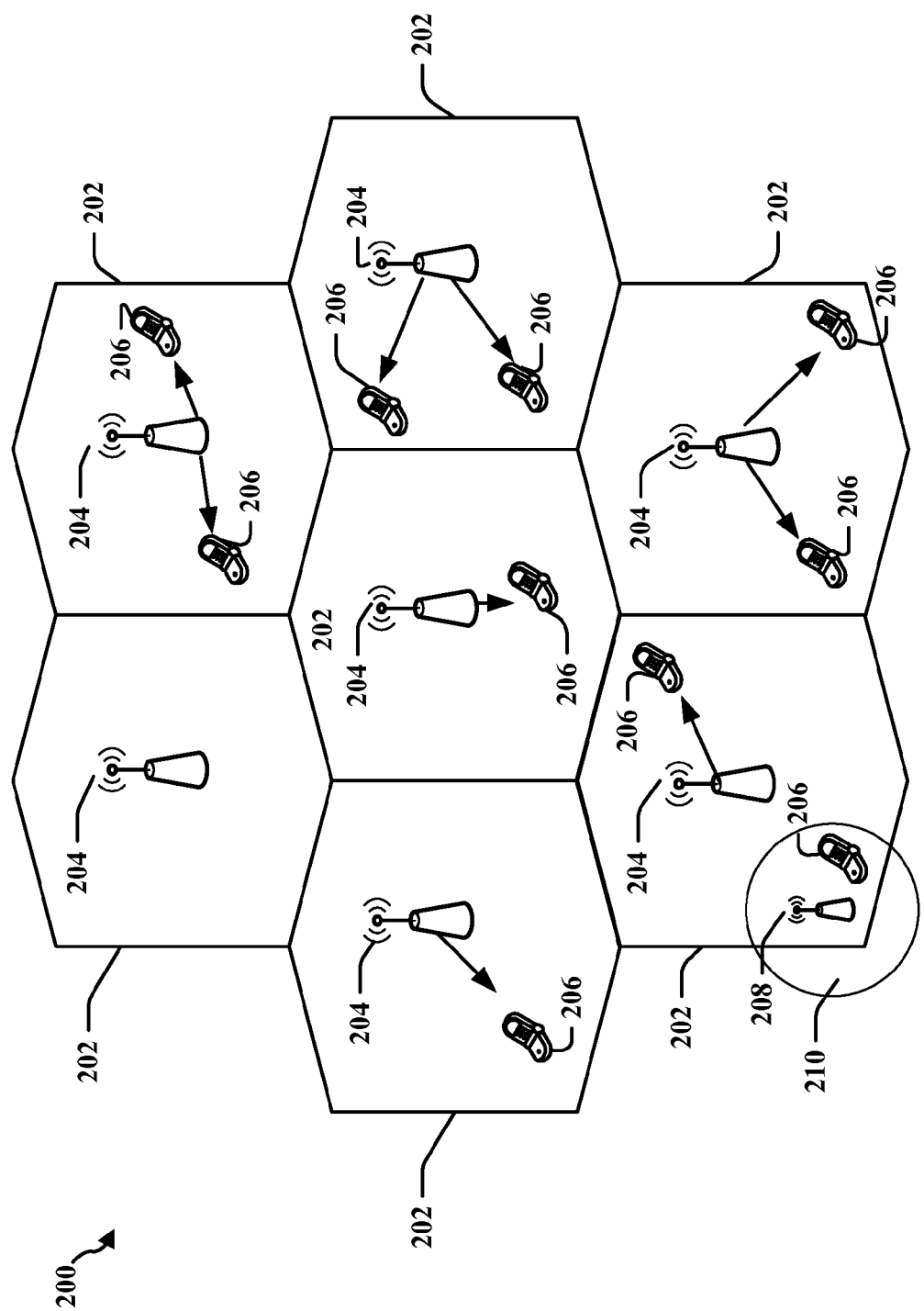
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
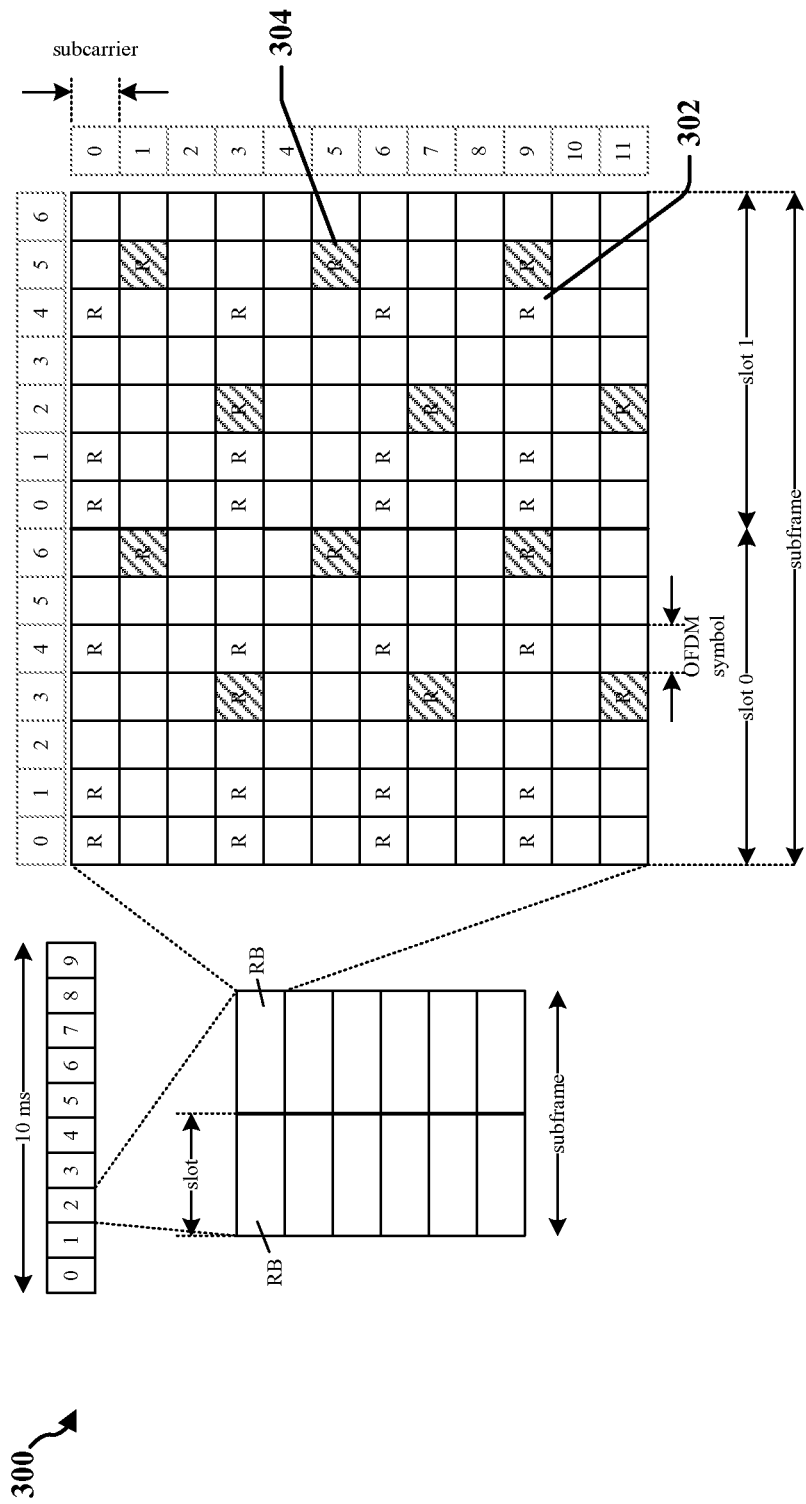
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
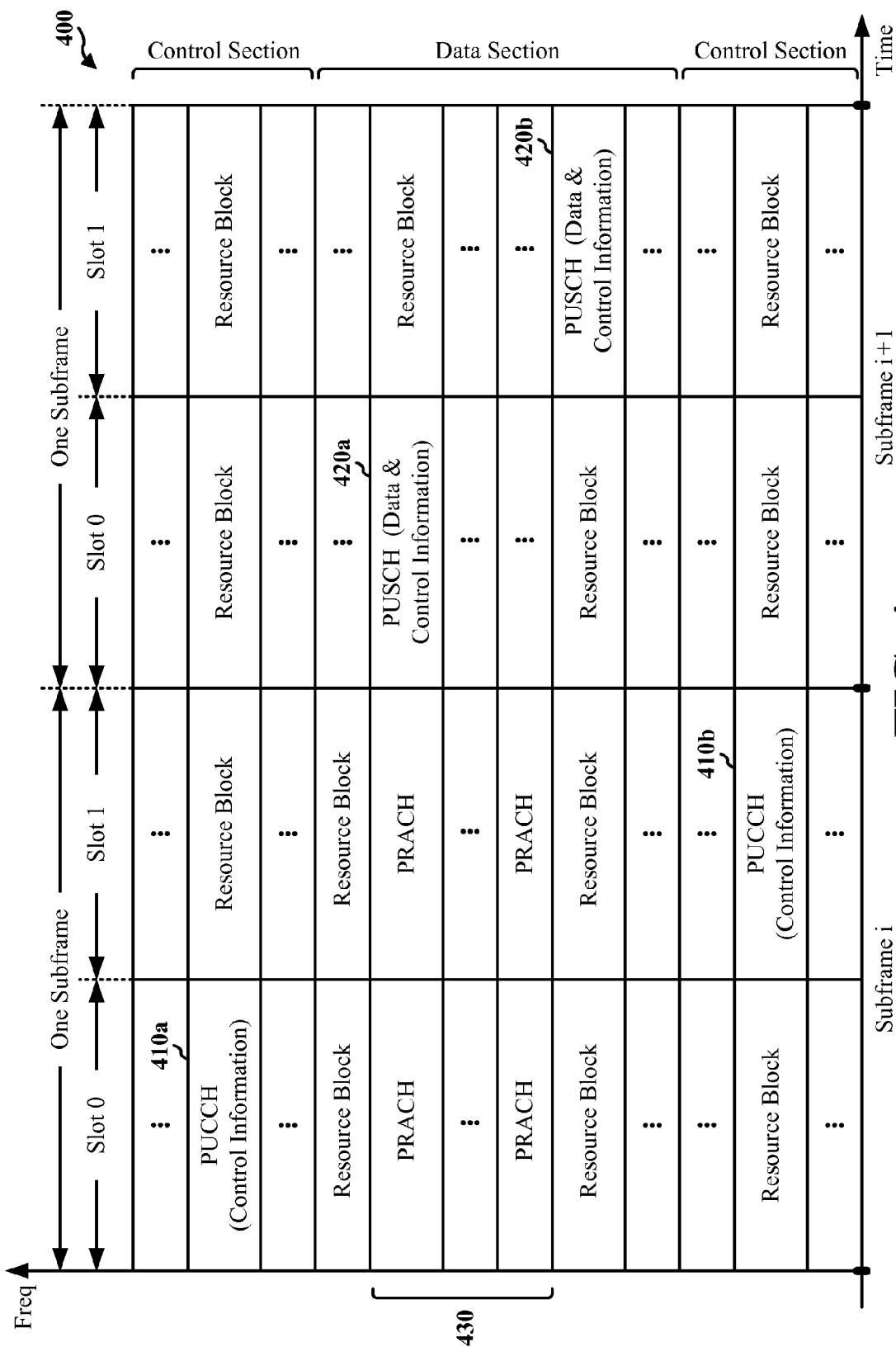
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
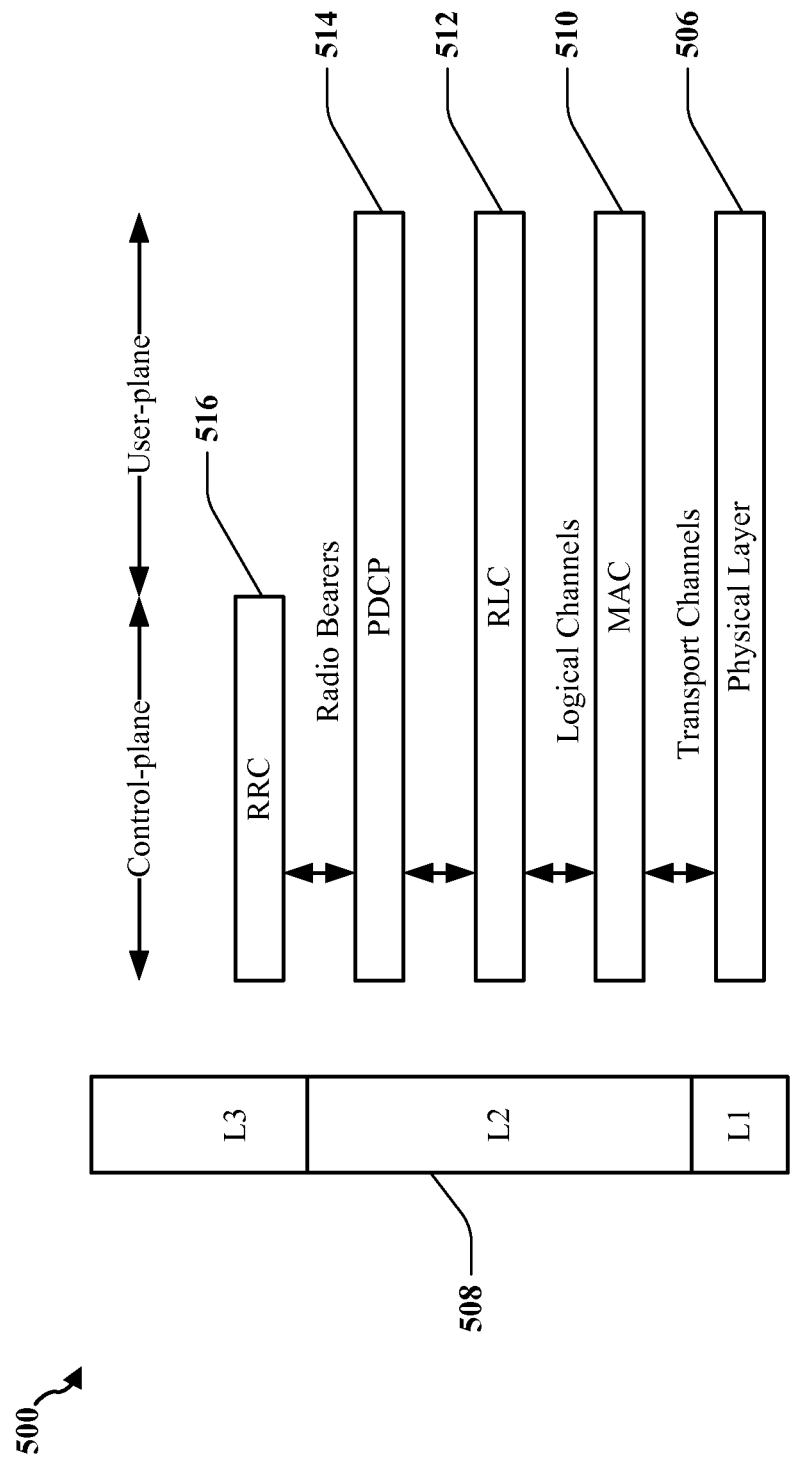
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
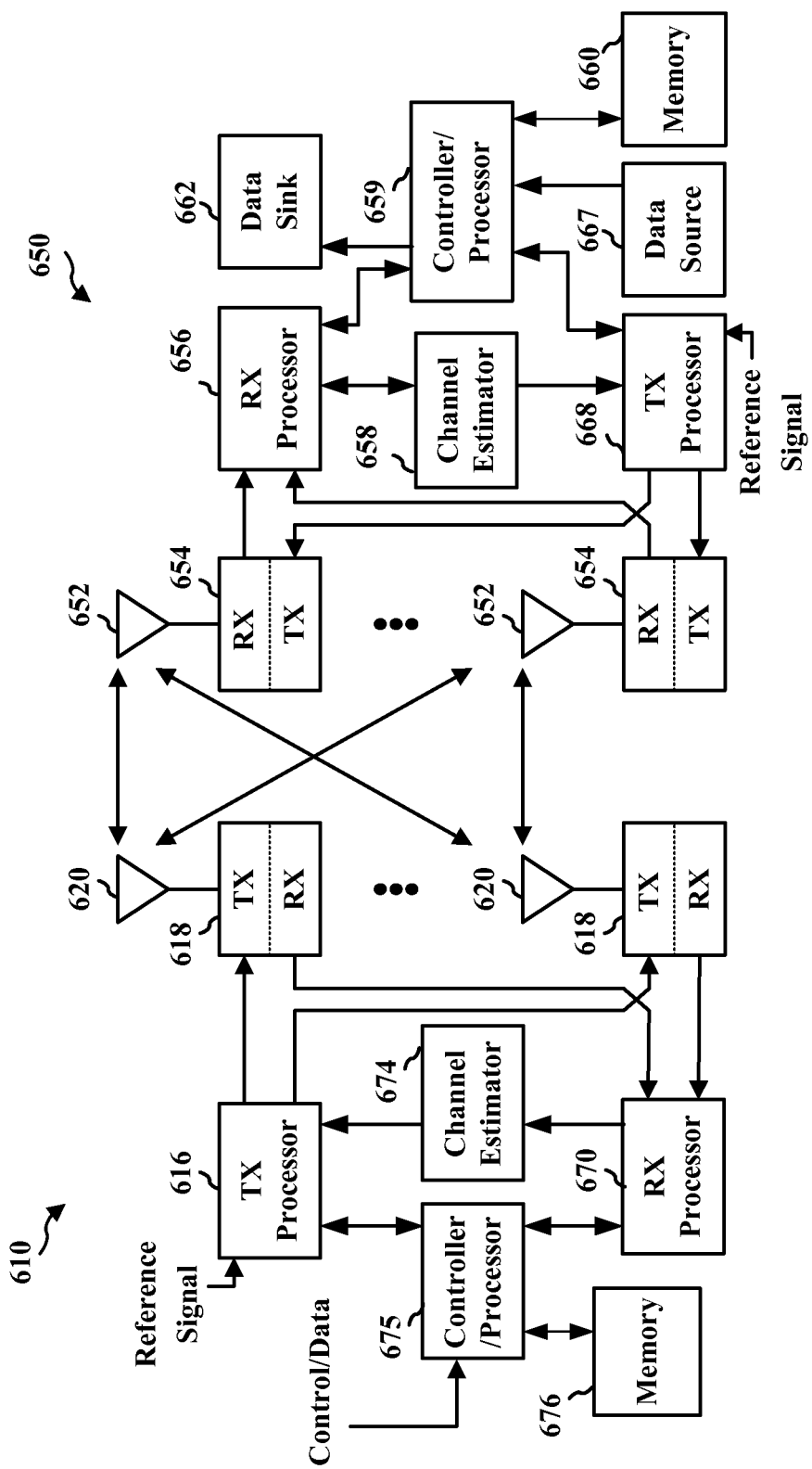
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
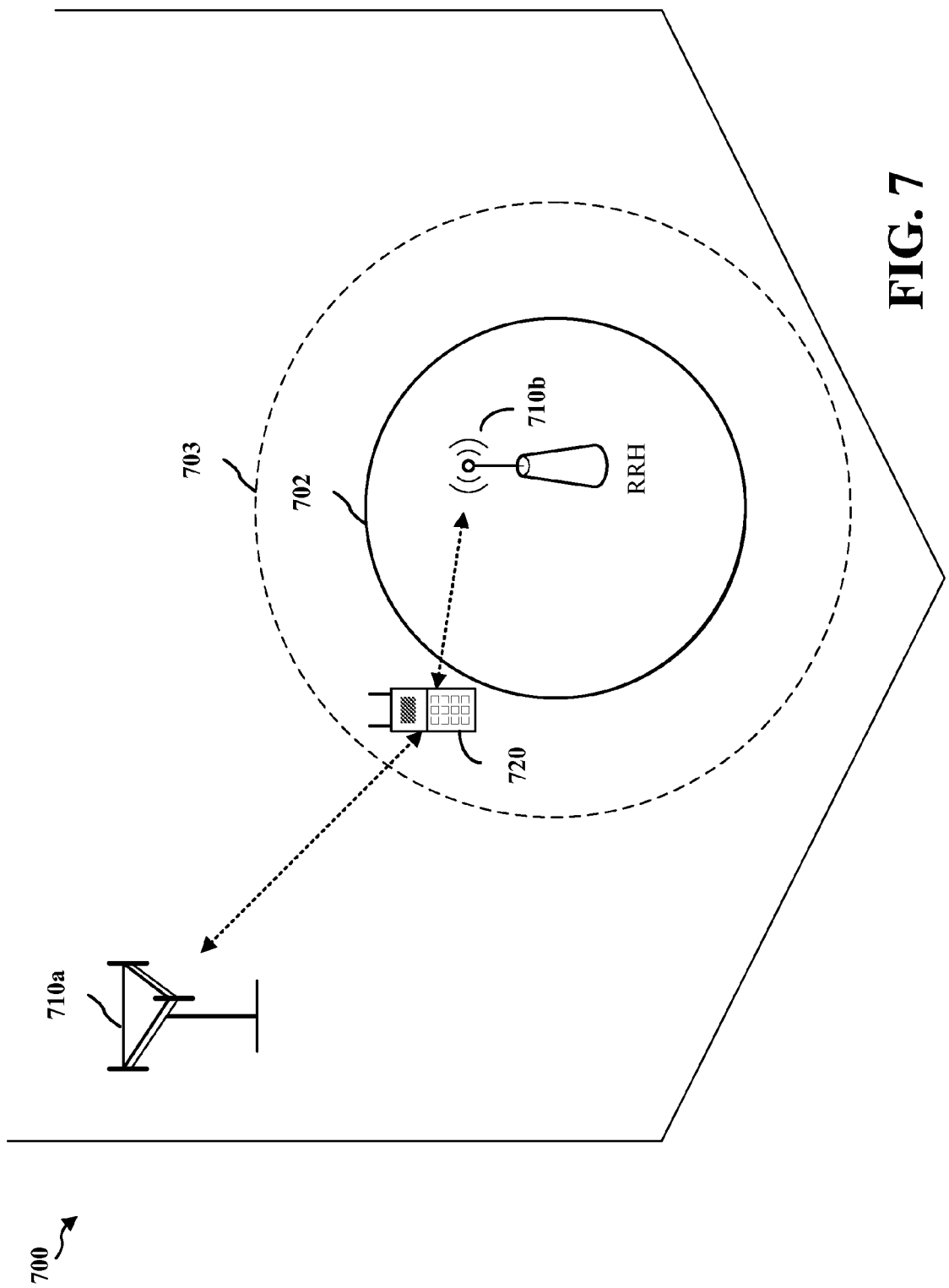
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710*b* may have a range expanded cellular region 703 that is expanded from the cellular region 702 through enhanced inter-cell interference coordination between the RRH 710*b* and the macro eNB 710*a* and through interference cancellation performed by the UE 720. In enhanced inter-cell interference coordination, the RRH 710*b* receives information from the macro eNB 710*a* regarding an interference condition of the UE 720. The information allows the RRH 710*b* to serve the UE 720 in the range expanded cellular region 703 and to accept a handoff of the UE 720 from the macro eNB 710*a* as the UE 720 enters the range expanded cellular region 703.

Figure 8:
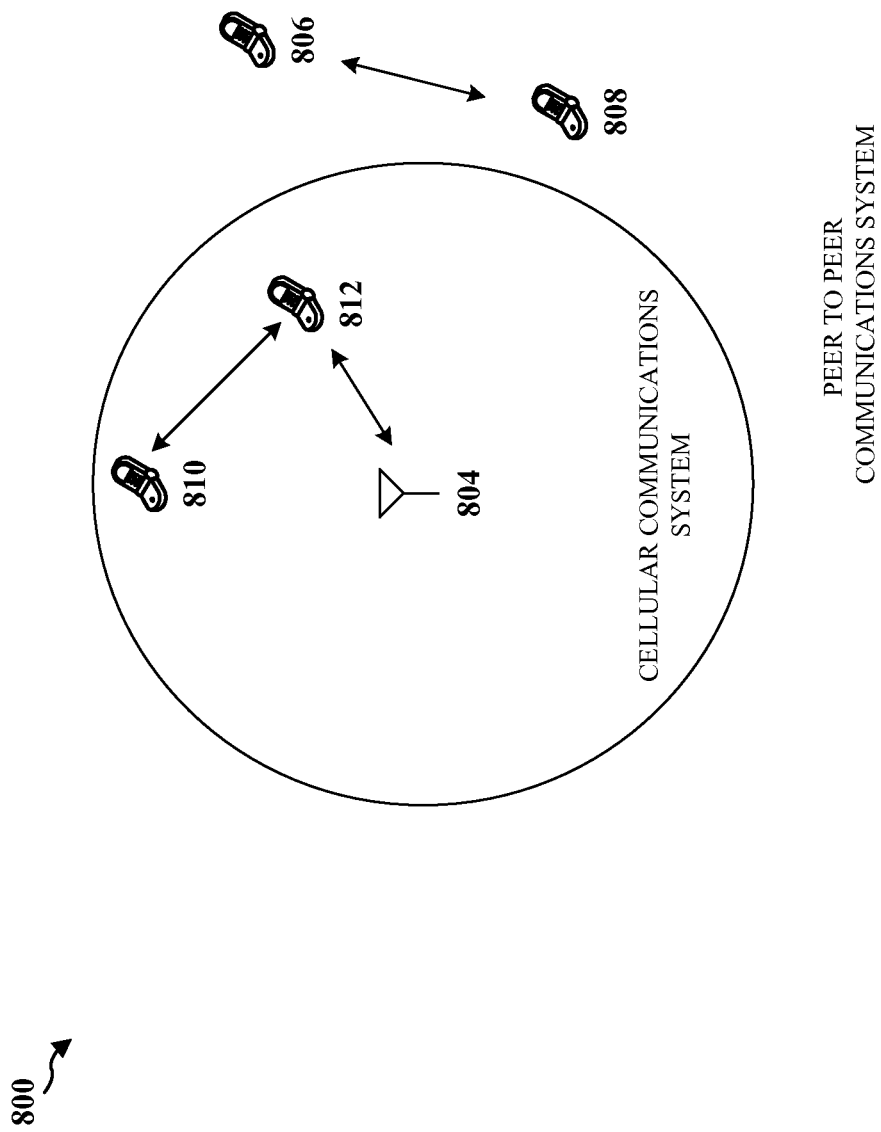
FIG. 8 is a drawing of an exemplary peer-to-peer communications system.

FIG. 8 is a drawing of an exemplary peer-to-peer communications system 800. The peer-to-peer communications system 800 includes a plurality of wireless devices 806, 808, 810, 812. The peer-to-peer communications system 800 may overlap with a cellular communications system, such as for example, a wireless wide area network (WWAN). Some of the wireless devices 806, 808, 810, 812 may communicate together in peer-to-peer communication, some may communicate with the base station 804, and some may do both. For example, as shown in FIG. 8, the wireless devices 806, 808 are in peer-to-peer communication and the wireless devices 810, 812 are in peer-to-peer communication. The wireless device 812 is also communicating with the base station 804.

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra may be applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard.

Figure 9B:
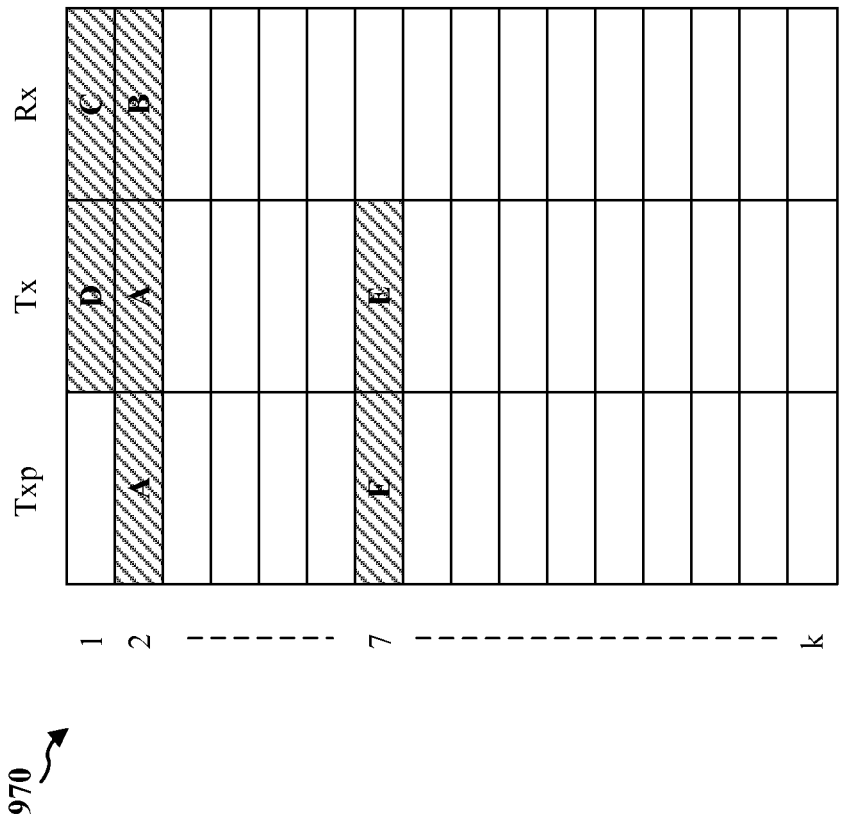
FIG. 9B is a second diagram for illustrating an exemplary connection scheduling signaling scheme for wireless devices.
Figure 9A:
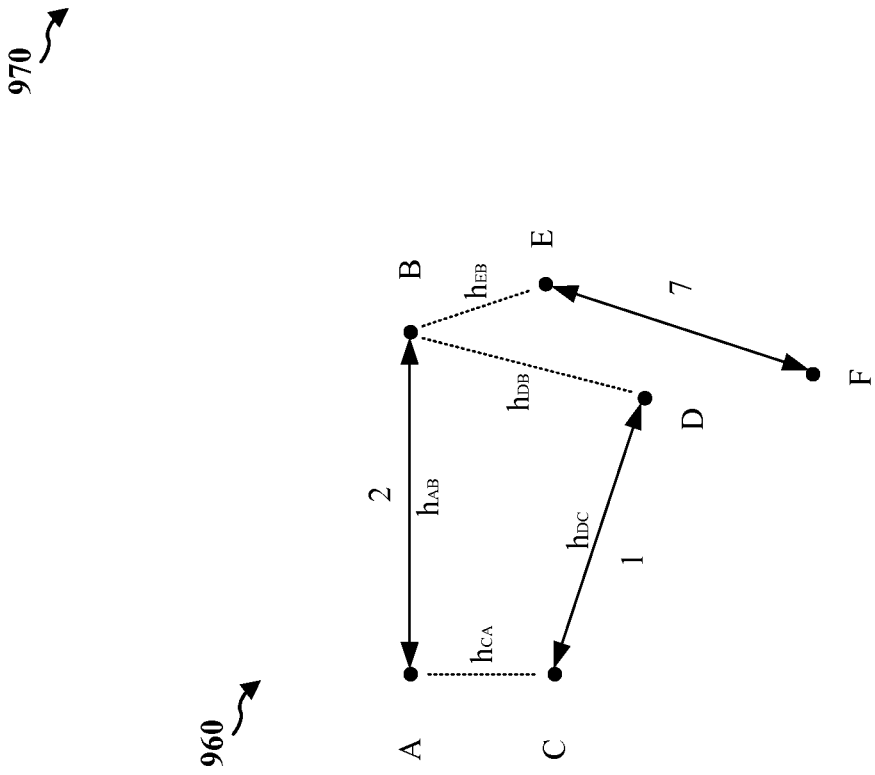
FIG. 9A is a first diagram for illustrating an exemplary connection scheduling signaling scheme for wireless devices.

FIG. 9A is a first diagram 960 for illustrating an exemplary connection scheduling signaling scheme for wireless devices. As shown in FIG. 9A, wireless device A is communicating with wireless device B, wireless device C is communicating with wireless device D, and wireless device E is communicating with wireless device F. The wireless device A is assumed to have transmit priority over the wireless device B, the wireless device C is assumed to have transmit priority over the wireless device D, and the wireless device E is assumed to have transmit priority over the wireless device F. Each of the links has a different medium access priority depending on the particular slot for communication. For the particular slot for communication, link 1 (A, B) is assumed to have a medium access priority of 2, link 2 (C, D) is assumed to have a medium access priority of 1, and link 3 (E, F) is assumed to have a medium access priority of 7.

FIG. 9B is a second diagram 970 for illustrating an exemplary connection scheduling signaling scheme for the wireless devices. FIG. 9B shows connection scheduling resources of first respective OFDM symbols of Txp, Tx, and Rx sub-blocks in a block corresponding to medium access priorities 1 through k in a connection scheduling subchannel. The connection scheduling resources include a plurality of subcarriers, each of the subcarriers corresponding to one of k frequency bands. Each of the frequency bands corresponds to a particular medium access priority. One block in the connection scheduling resources is split into three subblocks/phases: Txp, Tx, and Rx. The Txp-block is used by the node with transmit priority in the link to indicate whether the node with transmit priority will act as a transmitter or a receiver. If the node with transmit priority transmits on the allocated OFDM symbol in the Txp-block, the node with transmit priority indicates to the node without transmit priority an intent to act as a transmitter. If the node with transmit priority does not transmit on the allocated OFDM symbol in the Txp-block, the node with transmit priority indicates to the node without transmit priority an intent to act as a receiver. The Tx-block is used by potential transmitters to make a request to be scheduled. The transmitter transmits a direct power signal on the allocated OFDM symbol in the Tx-block at a power equal to a power used for the traffic channel (i.e., a power for transmitting the data segment). Each potential receiver listens to the tones in the Tx-blocks, compares the received power on each of the Tx-blocks to the received power on the Tx-block allocated to the transmitter of its own link, and determines whether to Rx-yield based on its own link medium access priority relative to other link medium access priorities and the comparison.

For example, assume the nodes A, D, and E transmit a transmit request signal in the Tx-block at a power equal to $P_A$, $P_D$, and $P_E$, respectively. The node B receives the transmit request signal from the node A at a power equal to $P_A|h_{AB}|^2$, where $h_{AB}$ is the path loss between the node A and the node B. The node B receives the transmit request signal from the node D with a power equal to $P_D|h_{DB}|^2$, where $h_{DB}$ is the path loss between the node D and the node B. The node B receives the transmit request signal from the node E with a power equal to $P_E|h_{EB}|^2$, where $h_{EB}$ is the path loss between the node E and the node B. The node B compares the power of the received transmit request signal from the node A divided by the sum of the powers of the received transmit request signals from other nodes with a higher priority to a threshold in order to determine whether to Rx-yield. The node B does not Rx-yield if the node B expects a reasonable signal-to-interference ratio (SIR) if scheduled. That is, the node B Rx-yields unless $P_A|h_{AB}|^2/P_D/|h_{DB}|^2 > \gamma_{RX}$, where $\gamma_{RX}$ is the threshold (e.g., 9 dB).

The Rx-block is used by the potential receivers. If the receiver chooses to Rx-yield, the receiver does not transmit in the allocated OFDM symbol in the Rx-block; otherwise, the receiver transmits an inverse echo power signal in the allocated OFDM symbol in the Rx-block at a power proportional to an inverse of the power of the received direct power signal from the transmitter of its own link. All of the transmitters listen to the tones in the Rx-block to determine whether to Tx-yield transmission of the data segment.

For example, the node C, having received the transmit request signal from the node D at a power equal to $P_D|h_{DC}|^2$, transmits a transmit request response signal in the Rx-block at a power equal to $K/P_D|h_{DC}|^2$, where hoc is the path loss between the node D and the node C, and K is a constant known to all nodes. The node A receives the transmit request response signal from the node C at a power equal to $K|h_{CA}|^2/P_D|h_{DC}|^2$, where $h_{CA}$ is the path loss between the node C and the node A. The node A Tx-yields if the node A would cause too much interference to the node C. That is, the node A Tx-yields unless $P_D|h_{DC}|^2/P_A|h_{CA}|^2 > \gamma_{TX}$, where $\gamma_{TX}$ is a threshold (e.g., 9 dB).

The connection scheduling signaling scheme is best described in conjunction with an example. The node C has no data to transmit and does not transmit in the Txp-block for medium access priority 1, the node A has data to transmit and transmits in the Txp-block for medium access priority 2, and the node E has data to transmit and transmits in the Txp-block for medium access priority 7. The node D has data to transmit and transmits in the Tx-block for medium access priority 1, the node A transmits in the Tx-block for medium access priority 2, and the node E transmits in the Tx-block for medium access priority 7. The node C listens to the tones in the Tx-blocks and determines to transmit in the Rx-block for medium access priority 1, as the node C has the highest priority. The node B listens to the tones in the Tx-blocks, determines that its link would not interfere with link 2, which has a higher medium access priority, and transmits in the Rx-block for medium access priority 2. The node F listens to the tones in the Tx-blocks, determines that its link would interfere with link 1 and/or link 2, both of which have a higher medium access priority, and Rx-yields by not transmitting in the Rx-block for medium access priority 7. Subsequently, both D and A listen to the tones in the Rx blocks to determine whether to transmit the data. Because D has a higher link medium access priority than A, D transmits its data. A will Tx-yield transmission of the data if A determines that its transmission would interfere with the transmission from D.

In a synchronous time division duplex (TDD) access network, such as a time division LTE (TD-LTE) femto network, uplink (UL) and downlink (DL) resource partitioning is global and semi-static. That is, all access points (APs) of such a network are synchronous and adhere to a global UL-DL resource partitioning pattern. This may cause inefficient resource utilization.

Figure 10:
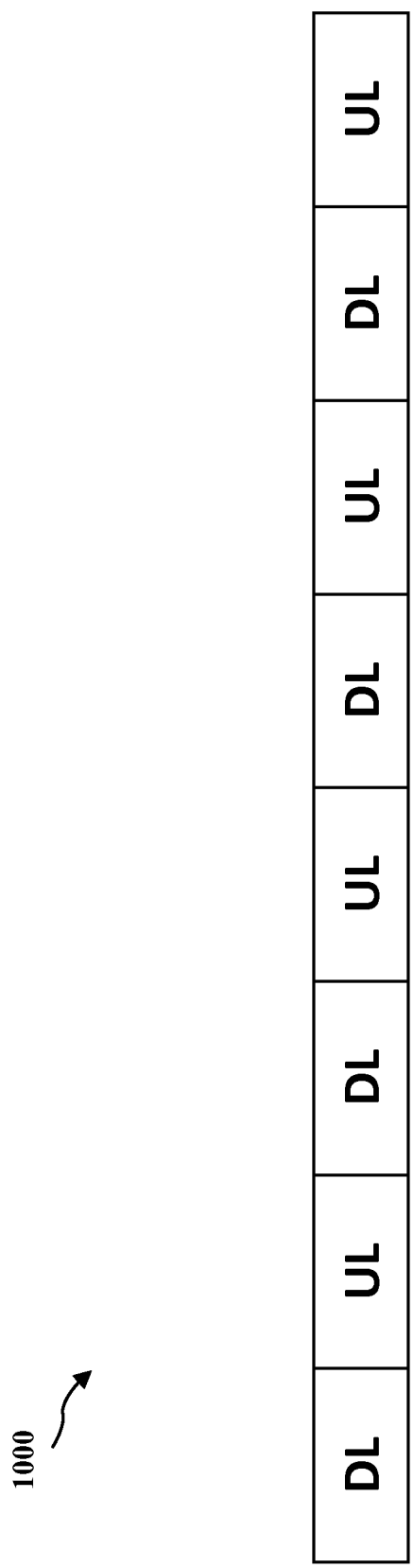
FIG. 10 is a diagram illustrating a system wide UL-DL resource partitioning common to all access points (APs) of a synchronous time division duplexing (TDD) access network.

For example, FIG. 10 is a diagram 1000 illustrating a system wide UL-DL resource partitioning common to all APs of a synchronous TDD access network. As shown in FIG. 10, the network is configured with 50% uplink resources and 50% downlink resources. However, if there is no uplink traffic for some of the APs of the network, the partitioned uplink resources are wasted. Similarly, if the traffic pattern changes over time, one of the two resources (i.e. uplink resources or downlink resources) will be overloaded while the other is under-utilized. The network resource configuration may be changed, but only on a slow time scale and requires coordination across all the APs in the network. The inefficient network resource configuration also leads to inefficient resource utilization throughout a system.

In an aspect, individual APs may dynamically choose their own UL-DL resource partitioning in order to adapt to changing traffic loads. As such, the AP (e.g., femto cell) may select its own UL-DL resource partitioning rather than a global partitioning common to all APs in a synchronous network.

The selected UL-DL resource partitioning may be one of a set of predetermined UL-DL resource partitions. The selected UL-DL resource partitioning may be dynamically changed based on a traffic load (e.g., uplink traffic versus downlink traffic) and an interference environment (e.g., uplink/downlink traffic pattern of other APs nearby). The selected UL-DL partitioning may be communicated to other APs and UEs with which the AP communicates via a broadcast, for example.

During a resolution phase, for a given AP, a resource slot may be determined to be used for uplink or downlink. This may involve an expansion of the connection scheduling signaling scheme described supra with respect to FIGS. 9A and 9B, wherein all TxPs per UE are synchronized to the AP.

For example, for downlink resource slots, if the AP has data to transmit, the AP may signal its UEs in the resolution phase that the downlink resource slot will be used for downlink. However, if the AP does not have data to transmit, the AP may signal it's UEs in the resolution phase that the downlink resource slot will be used for uplink. The AP may also signal its UEs in the resolution phase that the downlink resource slot will be used for uplink if the AP determines that the downlink resource slot should necessarily be used for uplink, such as when there is a backlog of uplink traffic, for example.

In another example, for uplink resource slots, if the UE has data to transmit, the UE may signal its AP in the resolution phase that the uplink resource slot will be used for uplink. However, if the UE does not have data to transmit, the UE may signal it's AP in the resolution phase that the UE does not require the uplink resource slot for uplink. Moreover, if any of the UEs communicate to the AP a need for the uplink resource slot to remain for uplink, the uplink resource slot is used for uplink. Otherwise, the uplink resource slot is used for downlink.

Signaling whether a particular resource slot is to be used for uplink or downlink may be accomplished by transmitting a signal, or by refraining from transmitting a signal. For example, the AP may signal its desire to use the downlink resource slot for downlink by transmitting in a Txp slot of the resolution phase, or signal its desire not to use the downlink resource slot for downlink by refraining from transmitting in the Txp slot. The reverse may also be the case—for example, the AP may signal its desire to use the downlink resource slot for downlink by refraining from transmitting in the Txp slot of the resolution phase, or signal its desire not to use the downlink resource slot for downlink by transmitting in the Txp slot. The UE may also signal whether a particular resource slot is to be used for uplink or downlink by transmitting a signal, or by refraining from transmitting a signal, similar to the examples described above with respect to the AP.

Table 1 below provides an example of an AP UL-DL schedule.

TABLE 1

| Uplink (U)-Downlink (D) Configuration | Downlink (D)-to-Uplink (U) Switch-point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As shown in Table 1, uplink/downlink switching may be configured for 5 ms or 10 ms periods. Moreover, in the example, uplink transmissions occur after a switch (S) subframe.

Figure 11:
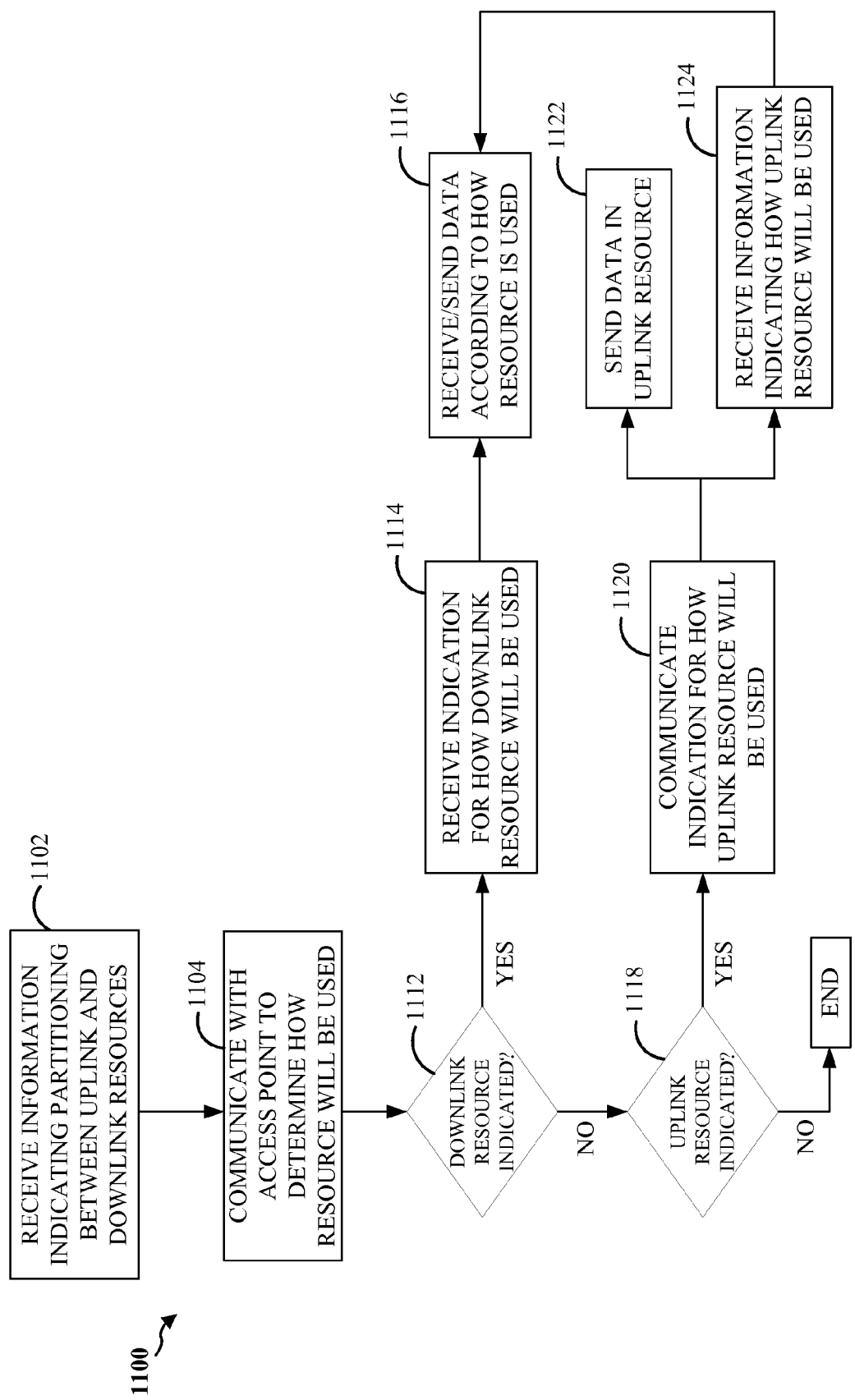
FIG. 11 is a flow chart of a method of wireless communication.

FIG. 11 is a flow chart 1100 of a method of wireless communication for dynamically selecting uplink-downlink resource partitioning. The method may be performed by a UE. At step 1102, the UE receives information from an access point (AP) indicating a partitioning between uplink and downlink resources. The information may be received via a broadcast signal transmitted from the AP. Moreover, the information received indicating the partitioning may be one partitioning of a set of partitionings, such as the set of partitionings depicted in Table 1 above. Also, the one partitioning may be different from a partitioning of a neighboring AP.

At step 1104, the UE communicates with the AP to determine how a resource will be used. For example, the AP may communicate with the UE to determine if a downlink resource will be locally used for an uplink transmission. Alternatively, the UE may communicate with the AP to determine if an uplink resource will be used for a downlink transmission.

At step 1112, the UE determines if the information received from the AP indicates that the resource is a downlink resource. If so, at step 1114, the UE may further receive an indication from the AP that the downlink resource will be used for a downlink transmission. Accordingly, at step 1116, the UE may receive a data transmission from the AP in the downlink resource.

Alternatively, at step 1114, the UE may receive an indication from the AP that the downlink resource will be used for an uplink transmission. If so, at step 1116, the UE may send a data transmission to the AP in the downlink resource.

At step 1118, the UE determines if the information received from the AP indicates that the resource is an uplink resource. If so, at step 1120, the UE may communicate an indication to the AP that the uplink resource will be used for an uplink transmission. Thereafter, at step 1122, based on the indication communicated at step 1120, the UE may send a data transmission to the AP in the uplink resource.

Alternatively, at step 1120, the UE may communicate an indication to the AP that the uplink resource can be used for downlink transmission by the AP and in that case will be not used for an uplink transmission by the UE. Accordingly, at step 1124, based on the indication communicated at step 1120, the UE may further receive information from the AP indicating whether the uplink resource will be used for an uplink or downlink transmission. Thereafter, at step 1116, the UE may receive a data transmission from the AP in the uplink resource, or the UE may send a data transmission to the AP in the uplink resource.

Figure 12:
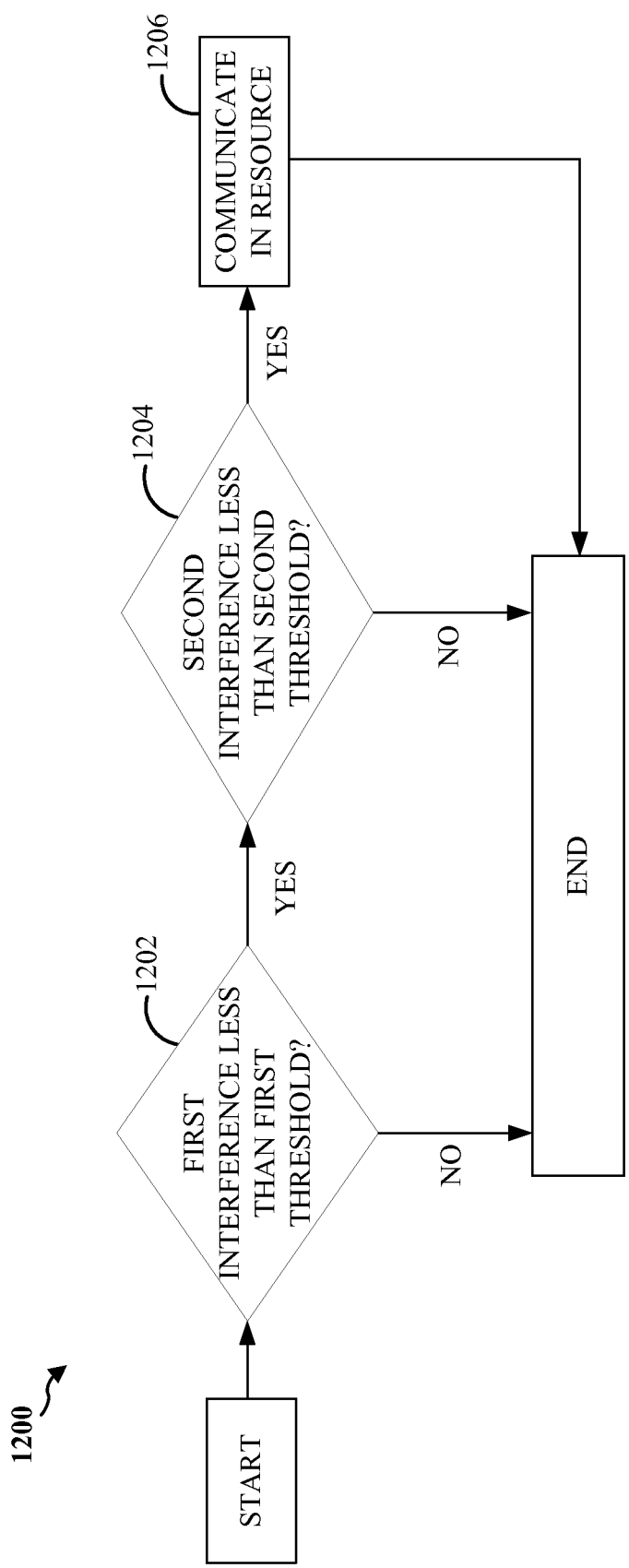
FIG. 12 is a flow chart of a method of wireless communication.

FIG. 12 is a flow chart 1200 of a method wireless communication. The method may be performed by a UE, and in connection with either of blocks 1116 and 1122 of FIG. 11. In an aspect, the UE may determine whether to communicate in a resource with the AP according to a level of interference involved with the resource. Specifically, the UE may determine to communicate in the resource based on a first interference received from a link of another AP, or a second interference caused to the link of the other AP.

Accordingly, at step 1202, the UE may determine if the first interference received from the link of the other AP is less than a first threshold. When the first interference received from the link of the other AP less than the first threshold, the UE may proceed to step 1204. If not, the UE does not communicate in the resource with the AP. In an aspect, the determination of step 1202 may be performed by the AP and communicated to the UE.

At step 1204, the UE may determine if the second interference caused to the link of the other AP is less than a second threshold. When the second interference caused to the link of the other AP is less than the second threshold, the UE may proceed to step 1206 and determine to communicate in the resource. Otherwise, the UE does not communicate in the resource with the AP. In an aspect, the determination of step 1204 may be performed by the AP and communicated to the UE.

Figure 13:
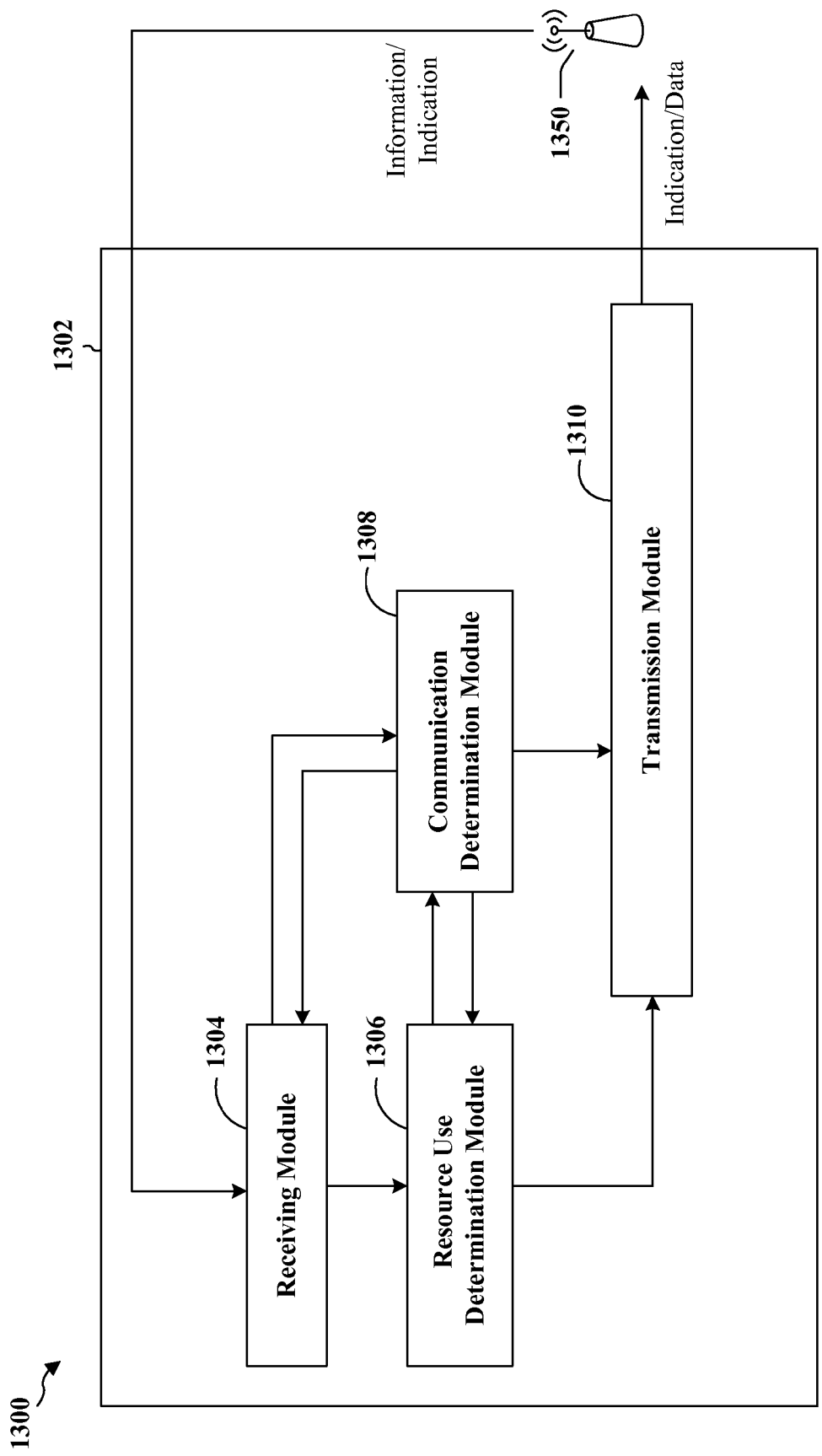
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus may be a UE. The apparatus 1302 includes a receiving module 1304, a resource use determination module 1306, a communication determination module 1308, and a transmission module 1310.

The receiving module 1304 receives information from an access point (AP) 1350 indicating a partitioning between uplink and downlink resources. The information may be received via a broadcast signal transmitted from the AP 1350. Moreover, the information received indicating the partitioning may be one partitioning of a set of partitionings, such as the set of partitionings depicted in Table 1 above. Also, the one partitioning may be different from a partitioning of a neighboring AP.

The resource use determination module 1306 receives the information from the receiving module 1306. Thereafter, the resource use determination module 1306 may communicate with the AP 1350 via the receiving module 1304 and/or the transmission module 1310 to determine how a resource will be used. Specifically, the resource use determination module 1306 may communicate with the AP 1350 to determine if a downlink resource will be used for an uplink transmission. Alternatively, the resource use determination module 1306 may communicate with the AP 1350 to determine if an uplink resource will be used for a downlink transmission.

The resource use determination module 1306 may determine if the information received from the AP 1350 indicates that the resource is a downlink resource. If so, the resource use determination module 1306 may further receive an indication from the AP 1350 that the downlink resource will be used for a downlink transmission. Accordingly, the resource use determination module 1306 may receive a data transmission from the AP 1350 in the downlink resource via the receiving module 1304.

Alternatively, the resource use determination module 1306 may receive an indication from the AP 1350 that the downlink resource will be used for an uplink transmission. If so, the resource use determination module 1306 may send a data transmission to the AP 1350 in the downlink resource via the transmission module 1310.

The resource use determination module 1306 may determine if the information received from the AP 1350 indicates that the resource is an uplink resource. If so, the resource use determination module 1306 may communicate an indication to the AP 1350 that the uplink resource will be used for an uplink transmission. Thereafter, based on the indication communicated, the resource use determination module 1306 may send a data transmission to the AP 1350 in the uplink resource via the transmission module 1310.

Alternatively, the resource use determination module 1306 may communicate an indication to the AP 1350 that the uplink resource will be not used for an uplink transmission by the apparatus 1302. Accordingly, based on the indication communicated, the resource use determination module 1306 may further receive information from the AP 1350, via the receiving module 1304, indicating whether the uplink resource will be used for an uplink or downlink transmission.

In an aspect, the communication determination module 1308 may determine whether to communicate in a resource with the AP 1350 according to a level of interference involved with the resource. Specifically, the communication determination module 1308 may determine to communicate in the resource based on a first interference received from a link of another AP, or a second interference caused to the link of the other AP.

Accordingly, the communication determination module 1308 may determine if the first interference received from the link of the other AP is less than a first threshold. When the first interference received from the link of the other AP is less than the first threshold, the communication determination module 1308 may proceed to determine if the second interference caused to the link of the other AP is less than a second threshold. If the first interference received from the link of the other AP is not less than the first threshold, the apparatus 1302 does not communicate in the resource with the AP 1350. In an aspect, the determination may be performed by the AP 1350 and communicated to the communication determination module 1308 via the receiving module 1304.

When the second interference caused to the link of the other AP is less than the second threshold, the communication determination module 1308 determines to communicate in the resource. Otherwise, the apparatus 1302 does not communicate in the resource with the AP 1350. In an aspect, the determination may be performed by the AP 1350 and communicated to the communication determination module 1308 via the receiving module 1304.

The apparatus may include additional modules that perform each of the steps of the algorithm in the aforementioned flow charts FIGS. 11 and 12. As such, each step in the aforementioned flow charts FIGS. 11 and 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
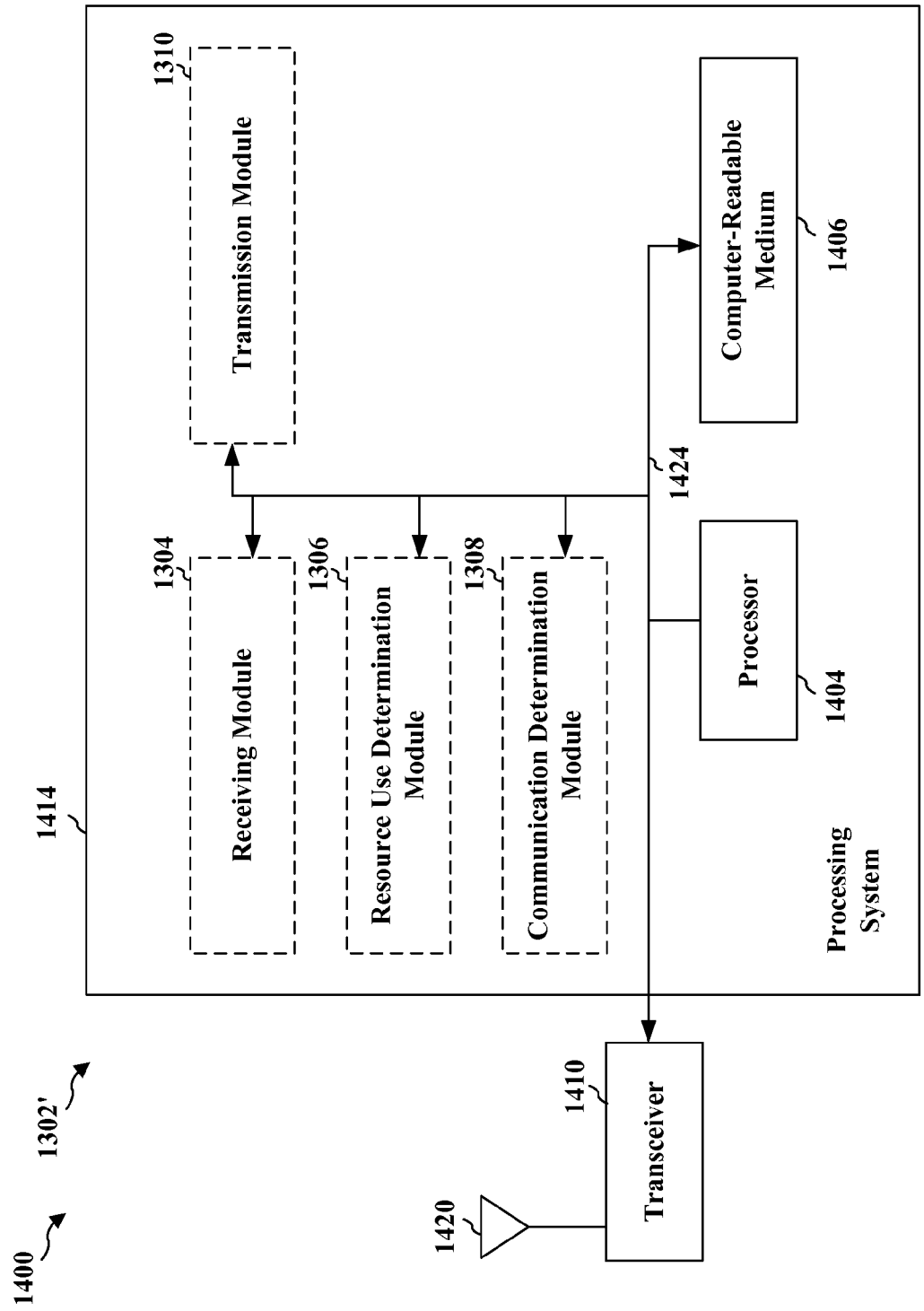
FIG. 14 is a diagram illustrating an example of a hardware implementation for an apparatus employing a processing system.

FIG. 14 is a diagram illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1304, 1306, 1308, 1310, and the computer-readable medium 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system further includes at least one of the modules 1304, 1306, 1308, and 1310. The modules may be software modules running in the processor 1404, resident/stored in the computer readable medium 1406, one or more hardware modules coupled to the processor 1404, or some combination thereof. The processing system 1414 may be a component of the UE 650 and may include the memory 660 and/or at least one of the TX processor 668, the RX processor 656, and the controller/processor 659.

In one configuration, the apparatus 1302/1302' for wireless communication includes means for receiving information indicating a partitioning between uplink and downlink resources, means for communicating with an access point to determine at least one of whether a downlink resource will be used for uplink or whether an uplink resource will be used for downlink, means for determining whether to communicate in a resource with the access point based on at least one of a first interference received from a link of another access point or a second interference caused to the link of the another access point, means for communicating in the resource with the access point when at least one of the first interference is less than a first threshold or the second interference is less than a second threshold, means for receiving a data transmission from the access point in the downlink resource, means for sending a data transmission to the access point in the downlink resource, means for sending a data transmission to the access point in the uplink resource, and means for receiving information from the access point indicating whether the uplink resource will be used for uplink or downlink.

The aforementioned means may be one or more of the aforementioned modules of the apparatus 1302 and/or the processing system 1414 of the apparatus 1302' configured to perform the functions recited by the aforementioned means. As described supra, the processing system 1414 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a user equipment (UE), comprising:
    receiving, by the UE, information indicating a partitioning between uplink and downlink resources from an access point, wherein the information allocates a first resource as a downlink resource or an uplink resource;
    communicating, by the UE, with the access point to determine at least one of whether a downlink resource will be used for uplink or whether an uplink resource will be used for downlink, including:
  determining, by the UE, that the UE will not transmit data in the first resource when the first resource is allocated as an uplink resource; and
  in response to the determination that the UE will not transmit data in the first resource:
    transmitting, by the UE, to the access point an indication indicating that the UE will not transmit data in the first resource, and
    allocating, by the UE, the first resource as a downlink resource.

2. The method of claim 1, further comprising determining whether to communicate in the first resource with the access point based on at least one of a first interference received from a link of another access point or a second interference caused to the link of the another access point.

3. The method of claim 2, further comprising communicating in the first resource with the access point when at least one of the first interference is less than a first threshold or the second interference is less than a second threshold.

4. The method of claim 1, wherein the information received indicates the first resource is the downlink resource, and the communicating with the access point comprises receiving an indication from the access point that the downlink resource will be used for downlink.

5. The method of claim 4, further comprising receiving a data transmission from the access point in the downlink resource.

6. The method of claim 1, wherein the information received indicates the first resource is the downlink resource, and the communicating with the access point comprises receiving an indication from the access point that the downlink resource will be used for uplink.

7. The method of claim 6, further comprising sending a data transmission to the access point in the downlink resource.

8. The method of claim 1, wherein the information received indicates the first resource is the uplink resource, and the communicating with the access point comprises communicating an indication to the access point that the uplink resource will be used for uplink.

9. The method of claim 8, further comprising sending a data transmission to the access point in the uplink resource.

10. The method of claim 1, wherein the information received indicates the first resource is the uplink resource, and the communicating with the access point comprises communicating an indication to the access point that the uplink resource will not be used for uplink by the UE.

11. The method of claim 10, further comprising receiving information from the access point indicating whether the uplink resource will be used for uplink or downlink.

12. The method of claim 1, wherein the information received indicating the partitioning is one partitioning of a set of partitionings.

13. The method of claim 12, wherein said one partitioning is different from a partitioning used by a neighboring access point.

14. An apparatus of wireless communication, the apparatus being a user equipment (UE), comprising:
  means for receiving, by the UE, information indicating a partitioning between uplink and downlink resources from an access point, wherein the information allocates a first resource as a downlink resource or an uplink resource;
  means for communicating, by the UE, with the access point to determine at least one of whether a downlink resource will be used for uplink or whether an uplink resource will be used for downlink, wherein the means for communicating is configured to
    determine, by the UE, that the UE will not transmit data in the first resource when the first resource is allocated as an uplink resource; and
    in response to the determination that the UE will not transmit data in the first resource:
      transmit, by the UE, to the access point an indication indicating that the UE will not transmit data in the first resource, and
      allocate, by the UE, the first resource as a downlink resource.

15. The apparatus of claim 14, further comprising means for determining whether to communicate in the first resource with the access point based on at least one of a first interference received from a link of another access point or a second interference caused to the link of the another access point.

16. The apparatus of claim 15, further comprising means for communicating in the first resource with the access point when at least one of the first interference is less than a first threshold or the second interference is less than a second threshold.

17. The apparatus of claim 14, wherein the information received indicates the first resource is the downlink resource, and the means for communicating with the access point is configured to receive an indication from the access point that the downlink resource will be used for downlink.

18. The apparatus of claim 17, further comprising means for receiving a data transmission from the access point in the downlink resource.

19. The apparatus of claim 14, wherein the information received indicates the first resource is the downlink resource, and the means for communicating with the access point is configured to receive an indication from the access point that the downlink resource will be used for uplink.

20. The apparatus of claim 19, further comprising means for sending a data transmission to the access point in the downlink resource.

21. The apparatus of claim 14, wherein the information received indicates the resource is the uplink resource, and the means for communicating with the access point is configured to communicate an indication to the access point that the uplink resource will be used for uplink.

22. The apparatus of claim 21, further comprising means for sending a data transmission to the access point in the uplink resource.

23. The apparatus of claim 14, wherein the information received indicates the first resource is the uplink resource, and the means for communicating with the access point is configured to communicate an indication to the access point that the uplink resource will not be used for uplink by the UE.

24. The apparatus of claim 23, further comprising means for receiving information from the access point indicating whether the uplink resource will be used for uplink or downlink.

25. The apparatus of claim 14, wherein the information received indicating the partitioning is one partitioning of a set of partitionings.

26. The apparatus of claim 25, wherein said one partitioning is different from a partitioning used by a neighboring access point.

27. An apparatus for wireless communication, the apparatus being a user equipment (UE), comprising:
  a memory;
  at least one processor coupled to the memory and configured to:

receive, by the UE, information indicating a partitioning between uplink and downlink resources from an access point, wherein the information allocates a first resource as a downlink resource or an uplink resource;

communicate, by the UE, with the access point to determine at least one of whether a downlink resource will be used for uplink or whether an uplink resource will be used for downlink, wherein to communicate with the access point, the at least one processor is configured to determine, by the UE, that the UE will not transmit data in the first resource when the first resource is allocated as an uplink resource; and in response to the determination that the UE will not transmit data in the first resource:

transmit, by the UE, to the access point an indication indicating that the UE will not transmit data in the first resource, and allocate, by the UE, the first resource as a downlink resource.

28. The apparatus of claim 27, wherein the at least one processor is further configured to determine whether to communicate in the first resource with the access point based on at least one of a first interference received from a link of another access point or a second interference caused to the link of the another access point.

29. The apparatus of claim 28, wherein the at least one processor is further configured to communicate in the first resource with the access point when at least one of the first interference is less than a first threshold or the second interference is less than a second threshold.

30. The apparatus of claim 27, wherein the information received indicates the first resource is the downlink resource, and the at least one processor configured to communicate with the access point is further configured to receive an indication from the access point that the downlink resource will be used for downlink.

31. The apparatus of claim 30, wherein the at least one processor is further configured to receive a data transmission from the access point in the downlink resource.

32. The apparatus of claim 27, wherein the information received indicates the first resource is the downlink resource, and the at least one processor configured to communicate with the access point is further configured to receive an indication from the access point that the downlink resource will be used for uplink.

33. The apparatus of claim 32, wherein the at least one processor is further configured to send a data transmission to the access point in the downlink resource.

34. The apparatus of claim 27, wherein the information received indicates the first resource is the uplink resource, and the at least one processor configured to communicate with the access point is further configured to communicate an indication to the access point that the uplink resource will be used for uplink.

35. The apparatus of claim 34, wherein the at least one processor is further configured to send a data transmission to the access point in the uplink resource.

36. The apparatus of claim 27, wherein the information received indicates the resource is the uplink resource, and the at least one processor configured to communicate with the access point is further configured to communicate an indication to the access point that the uplink resource will not be used for uplink by the UE.

37. The apparatus of claim 36, wherein the at least one processor is further configured to receive information from the access point indicating whether the uplink resource will be used for uplink or downlink.

38. The apparatus of claim 27, wherein the information received indicating the partitioning is one partitioning of a set of partitionings.

39. The apparatus of claim 38, wherein said one partitioning is different from a partitioning used by a neighboring access point.

40. A non-transitory computer-readable medium storing computer executable code for wireless communication, comprising code for:

receiving, by a user equipment (UE), information indicating a partitioning between uplink and downlink resources from an access point, wherein the information allocates a first resource as a downlink resource or an uplink resource;

communicating, by the UE, with the access point to determine at least one of whether a downlink resource will be used for uplink or whether an uplink resource will be used for downlink, including:

determining, by the UE, that the UE will not transmit data in the first resource when the first resource is allocated as an uplink resource; and in response to the determination that the UE will not transmit data in the first resource:

transmitting, by the UE, to the access point an indication indicating that the UE will not transmit data in the first resource, and allocating, by the UE, the first resource as a downlink resource.

41. The method of claim 1, wherein the transmission of the indication by the UE to the access point is performed in a resolution phrase of the first resource, wherein the communicating with the access point further comprises:

determining that an indication is received from the access point in the resolution phrase of the first resource when the first resource is allocated as a downlink resource, wherein the indication received from the access point indicates that the access point will not transmit data in the first resource; and allocating the first resource as an uplink resource in response to determining that the indication is received from the access point.

* * * * *